Nov. 10, 1964    C. F. CROCKER ETAL    3,156,913
ANALOG-TO-DIGITAL CONVERTER SYSTEM
Filed Jan. 18, 1962    4 Sheets-Sheet 1

INVENTORS
CLARK F. CROCKER
MELVIN PRAGER
BY Herbert W. Arnold
ATTORNEY

INVENTORS
CLARK F. CROCKER
MELVIN PRAGER

BY Herbert W. Arnold
ATTORNEY

INVENTORS
CLARK F. CROCKER
MELVIN PRAGER

BY Herbert W. Arnold
ATTORNEY

United States Patent Office 3,156,913
Patented Nov. 10, 1964

3,156,913
ANALOG-TO-DIGITAL CONVERTER SYSTEM
Clark F. Crocker, South Sudbury, and Melvin Prager, Ashland, Mass., assignors to Raytheon Company, Lexington, Mass., a corporation of Delaware
Filed Jan. 18, 1962, Ser. No. 167,124
13 Claims. (Cl. 340—347)

The present invention relates to converter systems, and, more particularly, to a high speed electronic analog-to-digital converter system for effecting conversion of electrical signals of random and/or differing repetition rates from analog to digital form.

Various means have heretofore been proposed in the prior art for converting analog information to digital information. While such known systems can be accurate at lower frequencies, they are not satisfactory for use in systems utilizing a high or very high pulse repetition rate of, for example, one to three megacycles. Although electronic coding and decoding systems have heretofore been proposed which are capable of operating at relatively high pulse frequencies, the upper pulse frequency limits of such circuits is severely limited and these circuits must be made vastly more complex and costly to achieve a slight increase in operating speed. In order to provide high speed operation, systems have been devised which convert in partial steps more than a single sample of information at one time. For example, the high speed electronic analog-to-digital converter system disclosed by the inventors in copending patent application, Serial No. 26,360, filed May 2, 1960, now abandoned, discloses such a system in which an internal clock or synchronizing source is used to initiate the sampling operations in the coding process. Although a system of this type is capable of achieving high speed operation, it is necessary for such high speed operation that the input signal occur in synchronization with the clock pulse frequency, or at a submultiple of the clock pulse frequency. Instances of unsynchronized input signal operation require that the operational speed be limited to less than one-half the clock frequency as a maximum operating rate and only if more complex and costly equipment is added to the system.

The present invention avoids the foregoing and other difficulties by means of a converter whose operation may be synchronized from an external source, which may be synchronized with characteristics of the input signal, and which may have a random and/or differing repetition rate. The system therefore will accept high speed information necessary for many multiplex pulse code systems or radar systems using different, differing, or random repetition rates. This is accomplished by sampling analog signals and sequentially feeding said signals into a plurality of comparators, the first of said comparators being synchronized by an external sync signal which may be random, and the other comparators being synchronized to operate sequentially at fixed intervals following operation of said comparators.

An analog signal to be converted is fed into a first comparator or decision circuit for recurrent sampling and distribution. The comparator or decision circuit is controlled as, for example, by means including a first reference voltage having an amplitude which is a predetermined percentage of the maximum amplitude of the input signal. The comparator circuit, in turn, controls a pulse generating circuit comprising a flip-flop circuit feeding delay devices having a plurality of stages. There are $n$ comparator circuits, each controlling delay devices having, respectively, $n-1$, $n-2$, etc., stages. Such stages, in accordance with the invention, are capable of accepting at random and/or differing rates information to be decoded. An external synchronization signal, which may be of random and/or differing repetition rates, depending upon the input signal to be decoded, is fed to each comparator circuit through appropriate delay devices for each successive stage. A reference voltage having an amplitude equal to approximately one-half the reference voltage supplied to the preceding comparator circuit is supplied through a summing matrix or ladder circuit to each of the last-mentioned comparator circuits. The information output from the first stage of each decoding device, with the exception of the last decoding device which is a one-unit delay device, is coupled to the summing matrix of the next successive comparator circuit. The information output from the second stage is supplied to the summing matrix of the next succeeding comparator circuit, etc. The last stage of each decoding device supplies one bit of information. As used herein, the term "comparator" includes conventional comparator circuits wherein two voltages are directly compared to provide a specified result as well as circuits for providing a specified result wherein two equal or unequal voltages are indirectly compared or wherein one voltage must be above or below a desired amount and also includes magnetic circuits providing the same result or results.

The input or analog signal is supplied to all but the first of each of the last-mentioned comparator circuits through separate or sequential delay devices which provide one unit of delay for the second comparator circuit, two units of delay for the third comparator circuit, etc., for the total number of comparator circuits utilized. In addition, the output of each comparator circuit is fed to continuously operating delay devices capable of operating at varying repetition rates, such delay lines each having one unit delay. The novel arrangement and mode of operation of the present invention provides a greatly increased rate of operation at random and differing repetition rates and does not require a sample and hold circuit timed to a sync pulse source at the input, as is required in most prior art devices. Thus, the present invention can operate upon the output of a synchronized multiplier or directly upon pulses wherein the information is contained in the amplitude of the pulses. High speed is obtained by making the speed of operation independent of the number of bits. For example, a six-binary digit converter constructed in accordance with the prior art and capable of a decision every 0.33 microsecond would require two microseconds for a single conversion. A converter constructed in accordance with the present invention can make, for example, six conversions within the same time period, although making a decision every 0.33 microsecond. From the above, it may be seen that a converter constructed in accordance with the present invention can operate much faster than prior art converters while using comparable decision rates and accepting randomly timed synchronization signals. In addition, where the present invention may well utilize a sample rate of three megacycles for a six-digit code, a converter constructed in accordance with the prior art teachings and operating at the same rate, will be vastly more complex and expensive and substantially less accurate and dependable.

The above-mentioned and other features and objects of this invention and the manner of obtaining them will be best understood by reference to the following description of an embodiment of the invention taken in conjunction with the accompanying drawings wherein.

Figure 1:
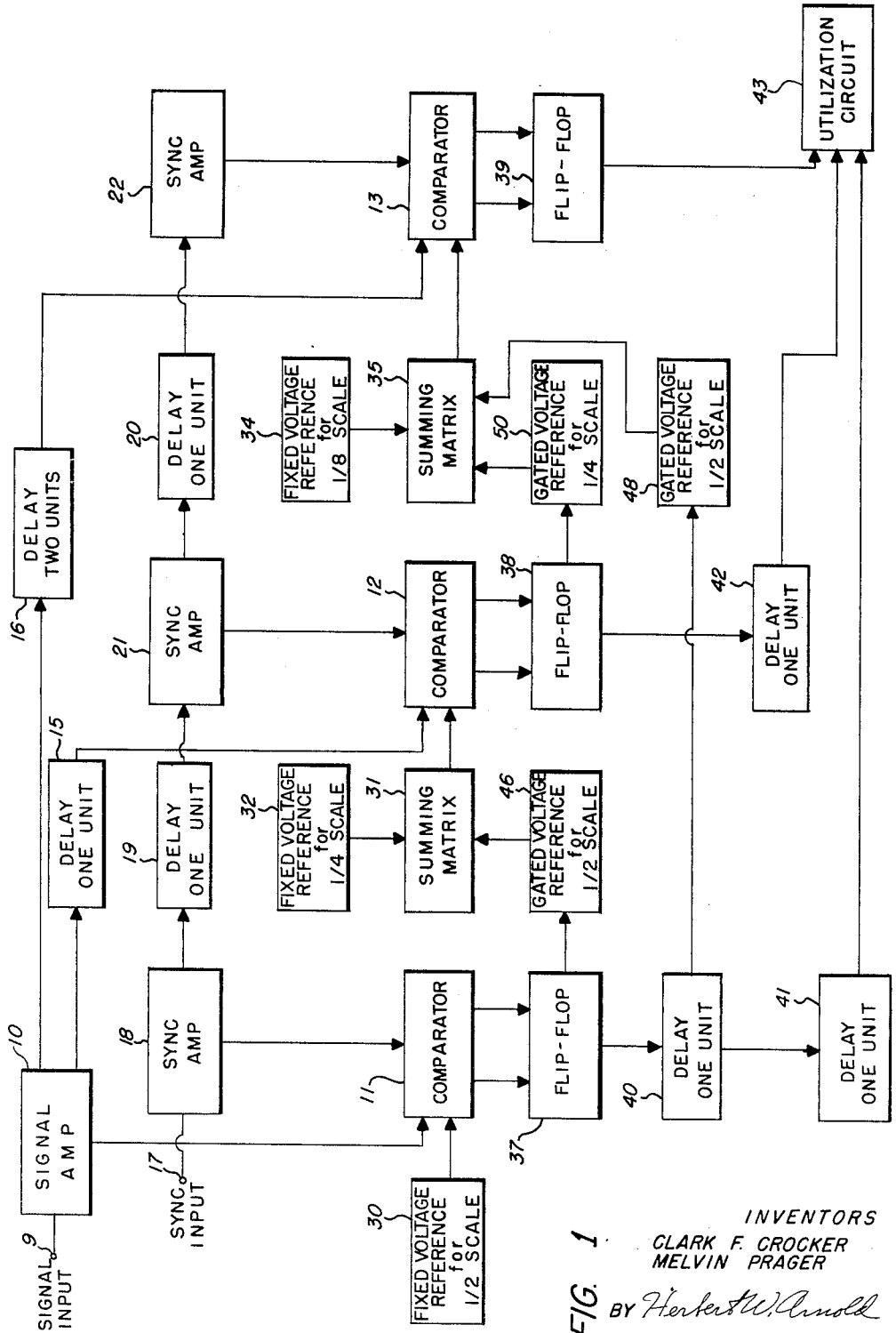
FIG. 1 is a block diagram of a particular system for producing a binary code representative of a given signal.

Although the principle of operation of the present invention is applicable to any number of bits, apparatus supplying three bits is considered sufficient for illustrative purposes and will be described herein by way of example. In FIG. 1, an input signal, the amplitude of which contains information and hence may be an analog signal or pulses, is applied to terminal 9 and signal amplifier 10. The amplified input signal is fed sequentially to pulse comparator circuit 11 and comparator circuits 12 and 13 by way of delay devices 15 and 16. An external sync signal is fed through a sync amplifier 18 and by delay unit 19, sync amplifier 21, a delay unit 20, and a sync amplifier 22, respectively, connected in series with its associated delay unit. The outputs of amplifiers 18, 21, and 22 are fed, respectively, to comparator devices 11, 12, and 13, which are used to measure the amplitude of the input signal sample applied thereto. The particular rate at which the comparator devices accept samples of the input signal is determined by the sync signal, which, as noted, is applied through appropriate devices 19 and 20.

Since the analog signal may be easily amplified, attenuation of the input signal by a delay line is unimportant provided the delay device has a linear response to within one-half of the last significant bit. Differences in attenuation between as many as five delay lines also presents no problem as the comparator circuits may contain conventional adjustments which compensate for these differences. In addition, the particular sync amplifier circuits are responsive to synchronization or mark signals of varying or random repetition rates. The particular mark or actuation signal from sync amplifier 18 is delayed sequentially by delay units 19 and 20. Thus, when a particular sync signal from sync amplifier 18 is fed into comparator 11, that particular mark or sync signal is delayed a period of time in delay unit 19 prior to introduction into sync amplifier 21. In this manner, the amplitude of the particular sample from signal amplifier 10 is measured first in comparator 11 and at a later time at comparator 12 independently of the time in which a second sample is introduced into comparator 11 by a sync signal from sync amplifier 18.

The comparator circuits 11, 12, and 13 are operable to either a binary "0" or binary "1" condition and may all be identical and comprised of conventional components, such as a differential amplifier or curent switch with an electronic switch in series with the differential amplifier to cut off or supply current to the differential amplifier as determined by the sync or mark pulses.

In addition to the actuation pulses, a fixed reference voltage source 30 is applied to comparator 11 having an amplitude which is a predetermined percentage (in the present case 50 percent) of full scale as, for example, may be determined by the maximum expected amplitude of the input signal. A fixed reference voltage source 32 (¼ full scale) having an amplitude equal to one-half the reference voltage supplied to comparator circuit 11 is supplied through a summing matrix or ladder circuit 31 to comparator 12, and a fixed ⅛ scale voltage reference 34 having an amplitude equal to one-half the reference voltage supplied to comparator circuit 12 is connected through a summing matrix or ladder circuit 35 to comparator circuit 13. Codes other than binary can be easily obtained by using different weights or reference voltages than those given immediately hereinbefore.

Each comparator circuit, 11, 12, and 13 controls, respectively, flip-flop circuits 37, 38, and 39. Delay devices 40 and 41, which may comprise tapped delay lines, are connected to flip-flop 37 and delay device 42, comprising a tapped delay line is connected to flip-flop device 38. The flip-flop circuits may utilize tunnel diodes, transistors or vacuum tubes in conventional manner and may comprise an Eccles-Jordan-type flip-flop circuit which contains a built-in symmetrical clamp. Since the flip-flop circuits are operable in a conventional manner to allow a binary "0" or binary "1" condition and supply a gated voltage to the summing matrices and also transfer their condition to the next succeeding delay stage, a tapped delay line will perform the same function with substantial advantages over the flip-flop circuits. This is because the mark pulses applied to each individual delay device will no longer be necessary and, as the sampling rate of number of mark pulses per second is increased, or becomes random, the delay line becomes more efficient and less complicated. Further, the use of delay lines, in accordance with the invention, permits information to be read in at a faster rate than it is read out, if so desired. The output signal of the terminal delay units 41, 42, and flip-flop circuit 39, which comprise the digital output signals of the converter, are supplied to a utilization circuit 43.

Upon application of a mark or sync signal to sync amplifier 18, comparator circuit 11 sets the flip-flop circuit 37 to the "1" state if the input signal from amplifier 10 is greater than 50 percent full scale, or to the "0" state if the input signal is less than 50 percent full scale. As in the case with a shift register having two or more flip-flop circuits or their equivalents in the present invention, the first flip-flop circuit supplies, either directly or indirectly, a precision signal or bias voltage to the next summing matrix, and the state of this flip-flop circuit is transferred to the next series-connected or cascaded flip-flop circuit until an output signal is obtained, as more fully explained hereinafter. The summing matrix is actuated by the corresponding flip-flop circuit and supplies the aforementioned precision signal or bias voltage to the comparator. Briefly, comparator circuit 11 sets flip-flop 37 to the "1" state or condition if the analog input pulse or signal is greater than 50 percent of full scale; actuation of flip-flop 37 to the "1" state feeds a gating pulse to precision gated voltage reference 46, equivalent to one-half full scale. The output voltage of source 46 is supplied to the summing matrix 31, which controls the comparator circuit 12. If flip-flop 37 is set to the "0" state or condition, the output applied to gated voltage source 46 is zero, thereby providing a zero signal to the summing matrix 31. By reason of the above, if flip-flop 37 is in the "0" state, comparator circuit 12 will compare against 25 percent supplied only by fixed voltage source 32, and if flip-flop 37 is in the "1" state, comparator circuit 12 will compare against 75 percent, since summing matrix 31 provides an output signal 25 percent of full scale for the "zero" state and an output signal of 50 plus 25 percent, or 75 percent of full scale for the "1" state.

The first input signal or sample is delayed by one unit of delay by delay device 15 and is supplied to the second comparator circuit 12 with the one-quarter scale fixed reference voltage 32 and the half-scale gated voltage reference 46 as summed in summing matrix 31. The delayed sync pulse in delay unit 19 is amplified in sync amplifier 21 and is introduced into comparator 12 to initiate the comparison of the delayed input signal from delay unit 15 with the output of summing matrix 31.

The state of flip-flop 37 is transferred or applied to delay line 40, which, in turn, and via line 47, actuates a precision voltage from gated voltage reference for one-half scale 48 to the second summing matrix 35 equal to the previously mentioned signal supplied to the first summing matrix 31 by flip-flop 37. The second decision on the first sample having been made in the comparator circuit 12, comparator circuit 12 sets flip-flop 38 to the proper state, depending on the voltages supplied to summing matrix 31. Flip-flop 38 then provides a pulse to gated voltage reference for one-quarter scale 50, and hence to summing matrix 35, equal to the fixed reference voltage supplied to summing matrix 31. Comparator circuit 13 makes the third decision on the first sample after two units of delay and sets flip-flop 39 to the proper state, which, in turn, supplies an output signal comprising one portion of the digital output signal to utilization circuit 43. At the same time, the previous state of flip-flop 38 is transferred to delay line 42 which supplies an output signal comprising a portion of the digital output signal to utilization circuit 43. At the same time, the signal in delay line 40 is transferred to delay line 41 which supplies a portion of the digital output signal representative of the first sample.

For the embodiment shown and described by way of example herein, comparator circuit 11 makes a decision by comparing a sample input signal against 50 percent of full scale, comparator circuit 12 makes a decision by comparing against either 25 percent of 75 percent of full scale, depending upon the existence or absence of the signal supplied to its summing matrix 31 by flip-flop 37; and comparator circuit 13 makes a decision by comparing against either 12.5 percent, 37.5 percent, 62.5 percent, or 87.5 percent of full scale as determined by the existence or absence of the signals supplied to its summing matrix 35 by delay device 40 and flip-flop circuit 38 in circuit with gated voltage source 50. For example, a 62.5 percent of full scale signal supplies a reference signal to the comparator circuit, which, if exceeded by the sample, accumulates the flip-flop connected thereto to the "1" state. As a result, at the time the sync pulse triggers the first comparator 11, the input signal is therefore sampled and its amplitude at that time is represented in binary form by the presence or absence of pulses fed all at the same time to utilization circuit 43 after a total of three units of delay. The delay time of a one unit delay for proper operation is slightly greater than the time required for a comparison to be made in a comparator circuit and for the comparator to recover from a given comparison to a condition in which it is ready to make a subsequent comparison.

After a first sample has been compared in comparator 11, subsequent comparisons of the sample are made in comparators 12 and 13 at fixed time intervals later as determined by the value of the delay units which delay the particular sync signal used to initiate the first comparison and actuate subsequent comparisons of the particular input signal. These comparisons occur independently of the time of occurrence of a second sample into the first comparator circuit 11 or the actuation of said circuit by a subsequent sync pulse. The successive comparison of each input signal through the comparators independently of the comparison of subsequent input signals provides high speed operation and the acceptance of random and/or varying repetition rates, thereby enhancing the flexibility and utility of the comparator device. The limit at which the comparator accepts signals depends only upon the time taken for the first comparison and the operation of the binary producing flip-flop 37.

Figure 2:
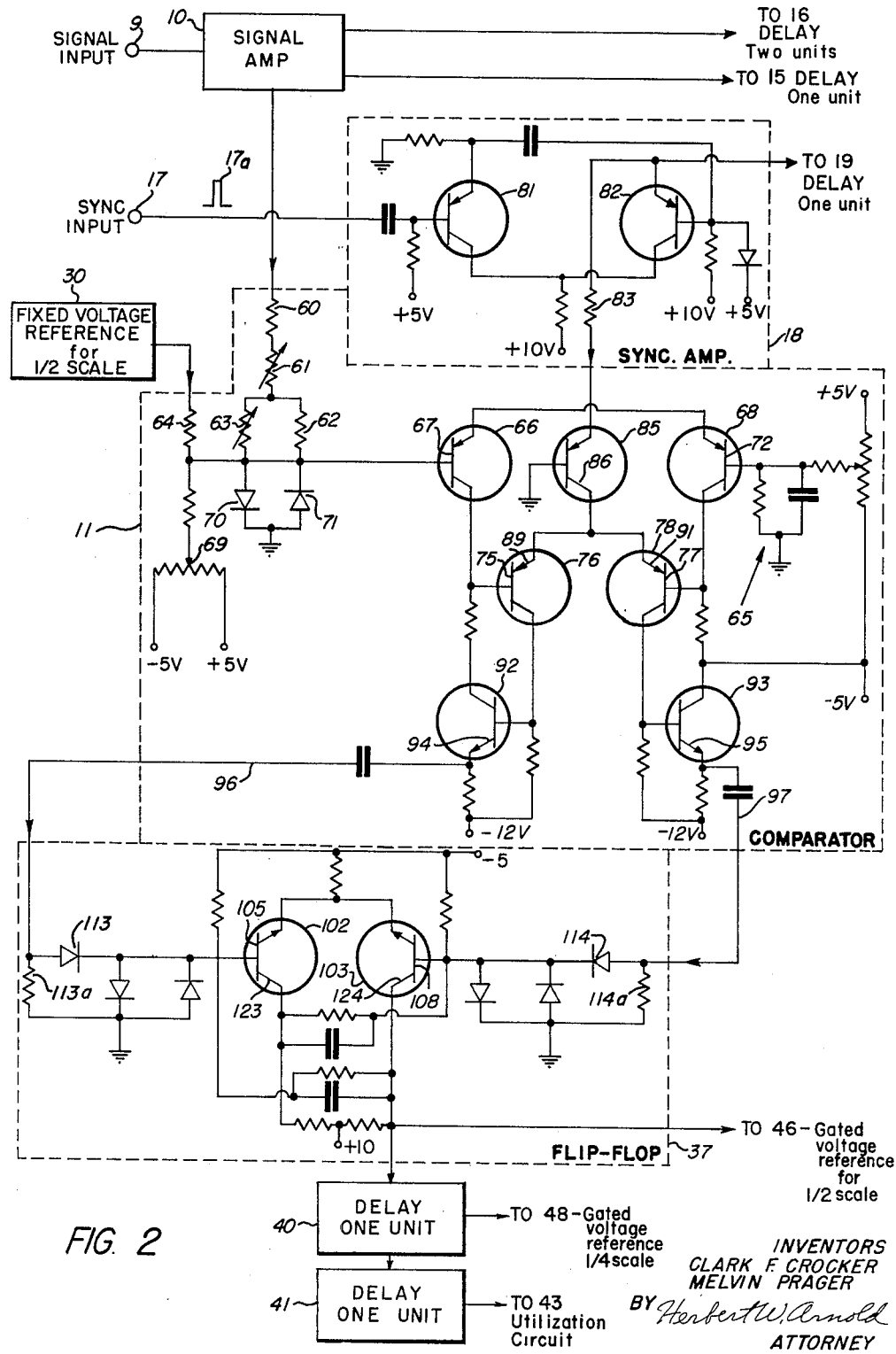
FIG. 2 shows details of the input comparator, flip-flop, and delay circuits in accordance with FIG. 1.
Figure 3:
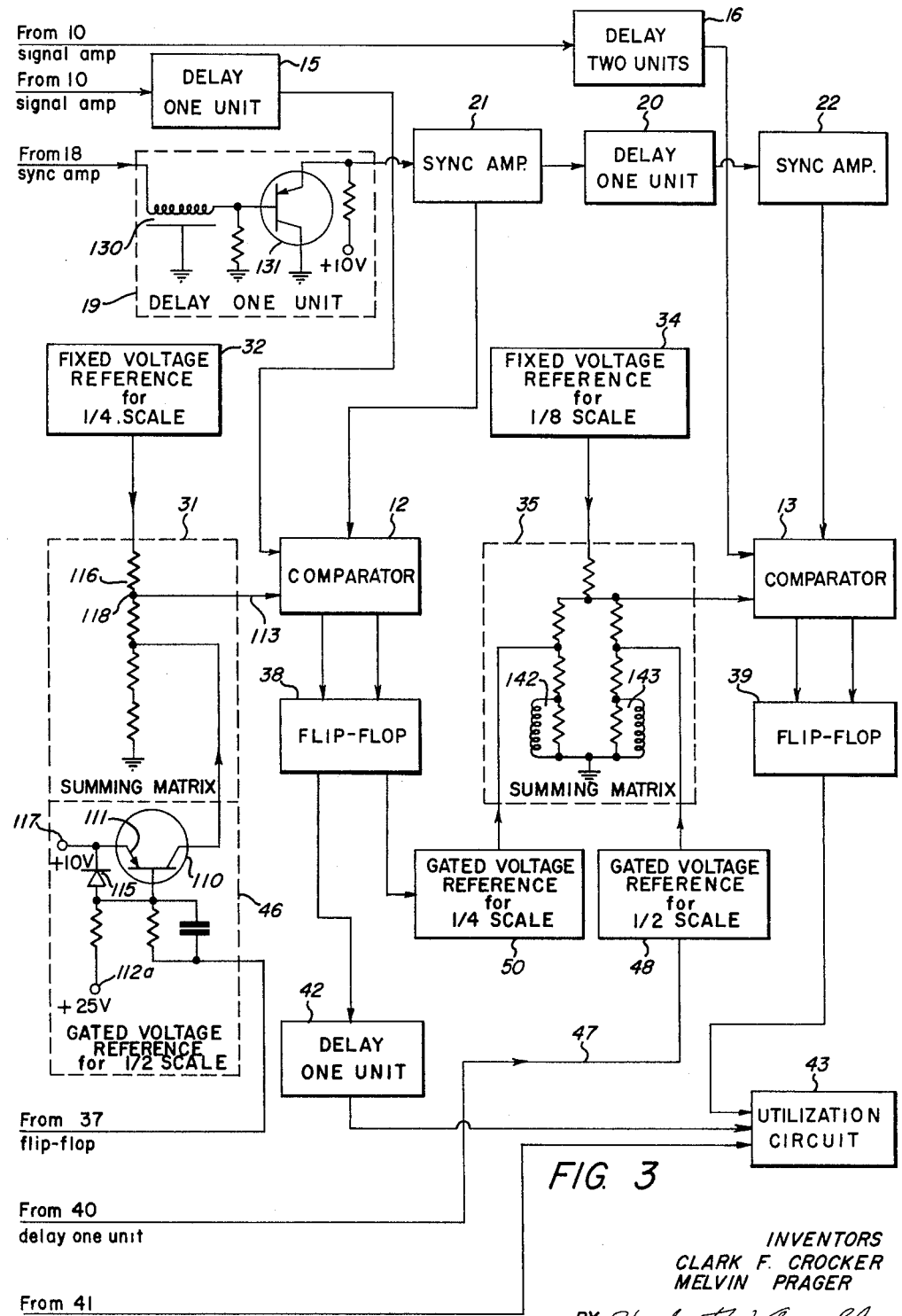
FIG. 3 shows a schematic diagram of a summing matrix, fixed reference voltage, and gated voltage source, such as used in connection with FIG. 1.

With reference now to FIGS. 2 and 3, there is shown a schematic diagram of an exemplary comparator circuit comprising comparator 11 to which an input signal at terminal 9 is fed by signal amplifier 10, a fixed voltage reference for one-half scale 30, for example 10 volts, flip-flop section 37 feeding delay units 40 and 41 and summing matrix 31 for summing or adding a fixed reference voltage and one or more gated voltages, such as may be supplied as the result of actuation of separate delay circuits. In such a case, the bias voltages would be precision signals equal to the fixed voltage supplied to the comparator circuit controlling each such preceding delay device. The amplified input signals are supplied from a low impedance output circuit of amplifier 10 through suitable isolating impedances of approximately one kilohm. These impedances when added to the output impedance of the amplifier terminate the inputs of the delay units in their characteristic impedance, as for example, slightly over one kilohm. In this manner, the output of the delay units act as input loads for the comparators, and also as output loads of the summing matrices. The preamplifier portion comprising signal amplifier 10 amplifies the input signal and applies such amplified input signals to comparator 11 by voltage divider action by way of a resistor network comprising resistors 60, 61, 62, 63, and associated circuitry. The fixed voltage reference for one-half scale, such as, for example, 10 volts, is combined by way of input resistor 64 with the amplified input signal and applied to transistors 66 and 68 which amplify the difference between the portion of the input signal from signal amplifier 10 and the fixed voltage reference for one-half scale applied to resistor 64. The fixed voltage reference, having a predetermined amplitude of the proper proportion of full scale, and the input voltage are summed and supplied to the base electrode 67 of transistor 66. Potentiometers 61 and 69, together with associated resistors 61 and 62, as shown, permit zero set of potentiometer 63. The associated voltage divider network 65 connected to the base 72 of transistor 68 and bias voltages connected thereto further cooperate to permit the zero set of potentiometer 63. Diodes 70 and 71 prevent the signal applied to base 67 from rising above predetermined limits. The output of transistors 66 and 68, which function as a differential amplifier, supply a potential to the base electrode 75 of transistor 76, or base electrode 77 of transistor 78, depending on which signal to the base electrodes 67 or 69 of transistors 66 and 68 is more negative. Sync pulses from terminal 17 are applied to sync amplifier 18 comprising transistors 81 and 82 connected as an amplifier, the output of which is applied to delay unit 19 of FIG. 3 and by way of output resistor 83 to driver transistor 85 which is a grounded base amplifier with high output impedance and low input impedance. The collector electrode 86 of transistor 85 is connected to emitter electrodes 89 and 91 of transistors 76 and 78. Transistors 92 and 93 are followers for amplifier transistors 76 and 78, and the output signals of the comparator circuit 11 to the initial flip-flop circuit are taken from the emitter electrodes 94, 95 of transistors 92 and 93. Transistors 76 and 78, as noted, function as a differential amplifier to further amplify the signal supplied from either transistor 66 or transistor 68. If the potential on the base electrode 75 of transistor 76 is less (more negative) than the potential on the base electrode 77 of transistor 78, which potentials are determined by the potential on base electrodes 67 and 72 of transistors 66 and 68, respectively, current will flow through transistor 76, and a pulse will be supplied to output line 96 which is connected to the emitter electrode 94 of transistor 92. As may be now apparent, the existence or absence of a pulse on line 96 or line 97 determines whether the initial flip-flop circuit controlled thereby is set to the "0" state or the "1" state.

Although a comparator circuit with a preamplifier has been shown and described, it is to be understood that the preamplifier portion may, if desired, be omitted and the input signal supplied to the base electrode 75 of transistor 76 and to the base electrode 77 of transistor 78.

The output lines 96 and 97 of comparator 11 are connected to the input circuit of an exemplary flip-flop circuit 37 comprising transistors 102 and 103 with their associated circuitries which comprise a bistable multivibrator. The signals for setting the flip-flop circuit are suppplied from lines 96 and 97, which are connected, respectively, to the base electrodes 105 and 108 through diodes 113 and 114, having input resistors 113a and 114a, respectively, connected in shunt therewith. A clamp circuit, as shown, is connected to the collector electrodes 123 and 124 of transistors 102 and 103, and a clamp voltage of 25 volts is applied to terminal 112a of summing matrix 31. The reference voltage supplied to the appropriate summing matrix may be taken from a common source so long as the voltage selected for this purpose is used consistently for each flip-flop circuit in the comparator. The output of flip-flop 37 is connected to one unit delay line 40, which, in turn, is connected by way of line 47 to gated voltage reference for one-half scale 48 of FIG. 3, as well as to delay line 41, as shown in FIGS. 1 and 2. The output of flip-flop 37 is also fed to gated voltage reference for one-half scale 46 and to summing matrix 31.

A transistor 110, having an emitter electrode 111, supplies a gated voltage reference for one-half scale when transistor 110 conducts in response to an input pulse applied to its base. Conduction of transistor 110 gates voltage from a source of ten volts applied at terminal 117 and diode 115 to summing network 31, including a resistor 116 for summing in connection with the fixed reference voltage for one-quarter scale 32. This voltage reference for one-quarter scale consists of a voltage source of, for example, ten volts, which, in conjunction with resistor 116, delivers a one-quarter scale voltage of, for example, 2.5 volts, to junction 118. The output of summing matrix 31 is applied by way of line 113 to the second comparator circuit 12, as previously described. In this manner, summing matrix 31 sums the fixed voltage reference for one-quarter scale and the gated voltage for one-half scale.

While summing matrix 31 performs the function of summing two independent voltages, summing matrix 35, which feeds comparator 13, sums three separate voltages. For example, the output of sync amplifier 18 is fed to a one-unit delay device 19, including a delay line 130 and transistor follower 131 to apply a delayed sync pulse to sync amplifier 21. The output of sync amplifier 21 is fed to comparator 12, one unit delay line 20, sync amplifier 22, and the third comparator 13, as shown in FIGS. 1 and 2. In response to conduction of the appropriate transistor, a voltage output is generated in response to gated voltage reference for one-half scale 48 and gated voltage reference for one-quarter scale 50. The summing matrix 35 sums these voltages with the fixed voltage reference for one-eighth scale 34, which is provided as shown in conjunction with a voltage source of, for example, ten volts.

In particular, summing matrix 35 comprises summing network 142 and 143, which are connected, respectively, to gated voltage reference for one-quarter scale and to gated voltage reference for one-half scale for summing with the fixed voltage reference for one-eighth scale 34 in the same manner as the summing operation is performed in connection with summing matrix 31. An input voltage from flip-flop 38 is applied to the gated voltage reference for one-quarter scale 50. At the same time, the gated voltage reference for one-half scale 48 is actuated by a pulse from delay unit 40 by way of line 47. In response, therefore, to voltage inputs from flip-flop 38 and delay device 40 by way of gated voltage reference 48 and gated voltage reference 50 and associated circuitry, summing networks 142 and 143 sum these voltages in connection with the fixed voltage reference for one-eighth scale 34. Thus, the summing function with respect to the signals from delay line 40 and flip-flop 38 is performed with actuation of comparator 13. The output of comparator 13 and flip-flop 39 transmits an appropriate binary signal to utilization circuit 43. In like manner, additional stages may be added to the comparator to provide additional accuracy and to handle simultaneously a greater number of comparisons.

Figure 4:
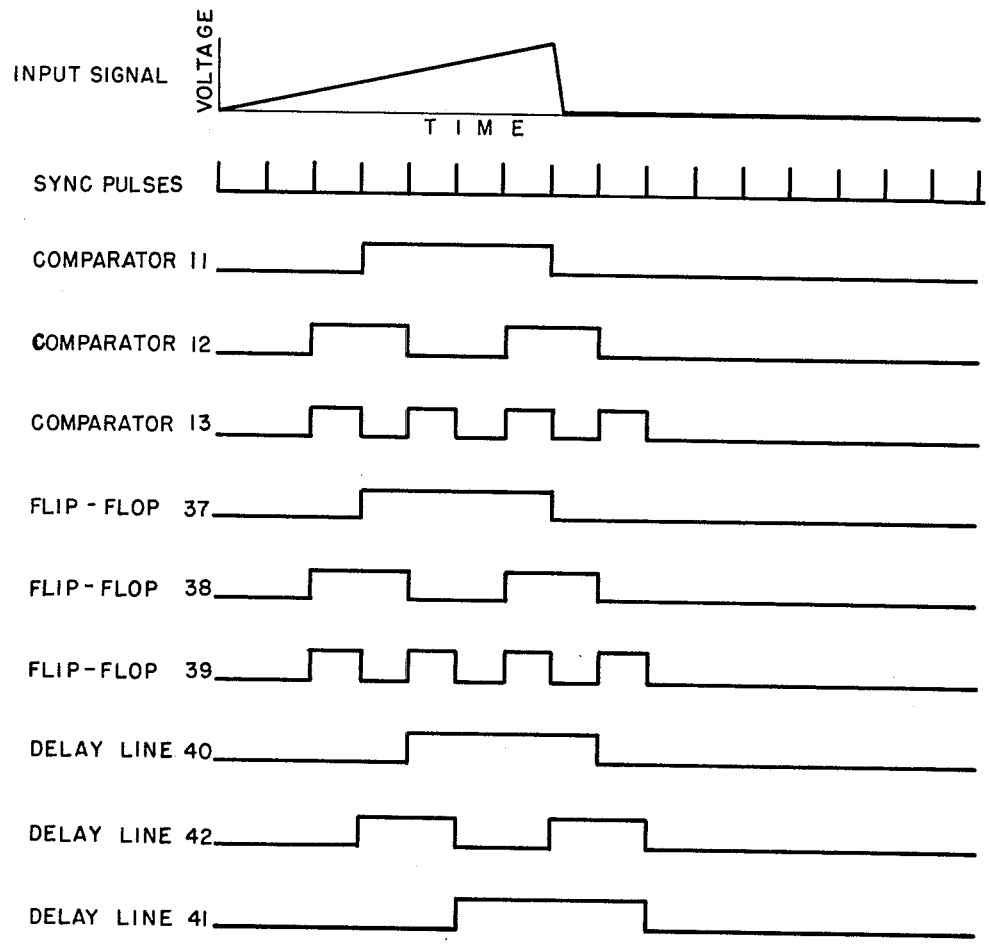
FIG. 4 shows waveforms of FIG. 1 at various locations.

By way of further explanation and to facilitate understanding of the invention, the states at different times of the various components comprising the present invention will be described for a specific example. Assume, for this example, that the sync pulse source is operating at one megacycle, that seven volts equals full scale, that the converter is accepting a ramp input voltage of one volt per microsecond, and that at seven volts the input voltage levels off to direct current. For reasons of convenience, assume that the reference voltage supplied to comparator circuit 11 is four volts (about 50 percent of full scale), the reference voltage supplied to summing matrix 31 is two volts (about 25 percent of full scale), the reference voltage supplied to summing matrix 35 is one volt (about 12.5 percent of full scale), the delay device 15 provides one unit delay or a one-microsecond delay and a delay device 16 provides two units of delay or a two-microsecond delay. The state of the components will be discussed at one microsecond intervals, beginning with time equals zero microsecond and ending with time equals ten microseconds. The sync pulses, such as waveform 17a as applied to terminal 17 of FIGS. 1 and 2, are applied every two-tenths of a microsecond and of a duration of one-tenth of a microsecond, as shown in FIG. 4 below the ramp voltage.

At $T=0$ microsecond, the input signal to comparator circuit 11 and delay devices 15 and 16 is zero and the output signals of delay devices 15 and 16 are also zero. All of the flip-flop circuits, delay units connected thereto, and comparator circuits are in the zero state. The reference or bias voltage to comparator circuit 11, which never changes, is four volts. The output voltage of summing matrices 31 and 35 to comparator circuits 12 and 13, respectively, which do change, are two volts and one volt, respectively.

At $T=1$ microsecond, the input signal to comparator circuit 11 and delay devices 15 and 16 has now risen to the one-volt level, but due to the delay provided by the delay devices, the output signals thereof are still zero. Since the state of all the comparator circuits and delay and flip-flop circuits is zero, the output signal or bias voltages of summing matrices 31 and 35 are still two volts and one volt, respectively.

At $T=2$ microseconds, the input signal to comparator circuit 11 and delay devices 15 and 16 has not risen to the two-volt level and the output of delay device 15 is one volt, whereas the output of delay device 16 is still zero volts. Because of the fact that all of the comparator circuits and all of the flip-flop and signal delay circuits are still in the "0" state, the output voltage of summing matrices 31 and 35 are still two volts and one volt, respectively.

At $T=3$ microseconds, the input signal to comparator circuit 11 and delay devices 15 and 16 has now risen to the three-volt level and the output signal of delay devices 15 and 16 are now two volts and one volt, respectively. Comparator circuit 11 and all of the flip-flop and delay circuits connected thereto are still in the "0" state, but comparator circuits 12 and 13 are now in the "1" state because the output voltage from summing matrices 31 and 35 are two volts and one volt, respectively, and are at least equal respectively to the amplitude of the input signal supplied to each of these decision circuits.

At $T=4$ microseconds, the input signal to comparator circuit 11 and delay devices 15 and 16 has now risen to the four-volt level, the output signal of delay device 15 is three volts and the output signal of delay device 16 is two volts. The four-volt input signal supplied to comparator circuit 11 equals the reference voltage supplied thereto, since comparator circuit 11 is now in the "1" state. Similarly, since the three-volt input signal (flip-flop 37 is still in the "0" state) supplied to comparator circuit 12 is greater than the two-volt reference signal supplied thereto by summing matrix 31, comparator circuit 12 is in the "1" state, and since the two-volt input signal supplied to comparator circuit 13 is less than the three-volt reference signal supplied thereto by summing matrix 35, comparator circuit 13 is still in the "0" state. The three-volt reference signal or bias voltage supplied to comparator circuit 13 is now comprised of one-volt fixed reference voltage and the two-volt bias voltage supplied by flip-flop 38, since it is now in the "1" state or condition. Flip-flop circuit 37 and delay devices 40, 41, and 42 are still in the zero state, whereas flip-flop circuits 38 and 39 are in the "1" state. Output signals or states of the terminal delay circuits 41, 42, and flip-flop 39 comprise the binary conversion of the first sample (001=1).

At $T=5$ microseconds, the input signal to comparator circuit 11 and delay devices 15 and 16 has now risen to the five-volt level and the output of delay device 15 is now four volts and the output of delay device 16 is now three volts. By reason of the five-volt input signal and the four-volt reference signal to comparator circuit 11, comparator circuit 11 and flip-flop circuit 37 are in the "1" state; by reason of the four-volt input signal and six-volt reference signal to comparator circuit 12, comparator circuit 12 is in the "0" state, but flip-flop circuit 38 is in the "1" state; and by reason of the three-volt input signal and three-volt reference signal to comparator circuit 13, comparator circuit 13 is in the "1" state but flip-flop 38 is in the "0" state. The six-volt reference signal or bias voltage supplied to comparator circuit 12 is now comprised of the two-volt fixed reference voltage and the four-volt bias voltage supplied to flip-flop 37, since it is now in the "1" state or condition. This bias voltage will not change further for the present case, since flip-flop 37 will always be in the "1" state for the present example. Delay circuits 40 and 41 are in the "zero" state and flip-flop circuit 38 is in the "1" state. The output signals or states of the terminal delay circuits 41, 42, and flip-flop 38, comprise the binary conversion of the second sample (010=2).

At $T=6$ microseconds, the input signal to comparator circuit 11 and delay devices 15 and 16 have now risen to the six-volt level and the output signal of delay device 15 is five volts and the output signal of delay device 16 is four volts. By reason of the six-volt input signal and four-volt reference signal to comparator circuit 11, comparator circuit 11 and flip-flop circuit 37 are in the "1" state; by reason of the five-volt input signal and six-volt reference signal to comparator circuit 12, comparator circuit 12 and flip-flop circuit 38 are in the "0" state; and by reason of the four-volt input signal and five-volt reference to comparator circuit 13, comparator circuit 13 is in the "0" state but flip-flop 39 is in the "1" state. The bias voltage on comparator circuit 13 is now five volts, due to the action of delay device 40 which supplies a bias voltage of four volts to summing matrix 35. Delay device 41 is in the "0" state and delay devices 40 and 42 are in the "1" state. The output signal or states of the terminal delay devices 41 and 42 and flip-flop 39 comprise the binary conversion of the third sample (011=3).

At $T=7$ microseconds, the input signal to comparator circuit 11 and delay devices 15 and 16 has now risen to the seven-volt level which is full scale. The output signal of the delay device 15 is six volts and the output voltage of delay device 16 is five volts. By reason of the full-scale seven-volt input signal and four-volt reference signal to comparator circuit 11, comparator circuit 11 and flip-flop circuit 37 are in the "1" state by reason of the six-volt input signal and six-volt reference signal to comparator circuit 12, comparator circuit 12 is in the "1" state and flip-flop circuit 38 is in the "0" state; and by reason of the five-volt input signal and five-volt reference signal to comparator circuit 13, comparator circuit 13 is in the "1" state and flip-flop circuit 39 is in the "0" state. Delay devices 40 and 41 are in the "1" state and delay device 42 is in the "0" state. The output signal or states of the terminal delay circuits 41, 42, and the flip-flop 39 comprise the binary conversion of the fourth sample (100=4).

At $T=8$ microseconds, the input signal to comparator circuit 11 and delay devices 15 and 16 is still at the seven-volt level, the output signal of delay device 15 is seven volts or full scale, and the output signal of delay device 16 is six volts. By reason of the seven-volt input signal and four-volt reference signal to comparator circuit 11, comparator circuit 11 and flip-flop 37 are in the "1" state; by reason of the full-scale seven-volt input signal and the six-volt reference signal to comparator circuit 12, comparator circuit 12 and flip-flop circuit 38 are in the "1" state; and by reason of the six-volt input signal and seven-volt reference signal to comparator circuit 13, comparator circuit 13 is in the "0" state and flip-flop circuit 39 is in the "1" state. The bias voltage on comparator circuit 13 is now seven volts due to the action of delay circuit 40 and flip-flop 38. Delay circuit 40 supplies a bias voltage of four volts and flip-flop circuit 38 supplies a bias voltage of two volts to summing matrix 35. These voltages will not change further for the present case, since flip-flop circuits 37 and 38 will always be in the "1" state for the present example. Delay devices 40 and 41 are in the "1" state and delay device 42 is in the "0" state. The output signals or states of delay circuits 41, 42 and flip-flop 39 comprise the binary conversion of the fifth sample (101=5).

At $T=9$ microseconds, the input signal to comparator circuit 11 and delay devices 15 and 16 is still at the seven-volt level and output signals of the delay devices 15 and 16 are now both seven volts. By reason of the seven-volt input signal and four-volt reference signal to comparator circuit 11, comparator circuit 11 and flip-flop 37 are both in the "1" state; by reason of the seven-volt input signal and six-volt reference signal to comparator circuit 12, comparator circuit 12 and flip-flop circuit 38 are both in the "1" state; and by reason of the seven-volt input signal and seven-volt reference signal to comparator circuit 13, comparator circuit 13 is in the "1" state and flip-flop circuit 39 is in the "0" state. Delay devices 40, 41, and flip-flop 39 are in the "1" state. The output signal or state of delay devices 41, 42, and flip-flop 39 comprise the binary conversion of the sixth sample (110=6).

At $T=10$ microseconds, the input signal to comparator circuit 11 and delay devices 15 and 16 is still at the seven-volt level and the output signal of delay devices 15 and 16 is also seven volts. By reason of the seven-volt input signal and four-volt reference signal to comparator circuit 11, comparator circuit 11 and flip-flop circuit 37 are both in the "1" state by reason of the seven-volt input signal and six-volt reference signal to comparator circuit 12, comparator circuit 12 and flip-flop circuit 38 are both in the "1" state; and by reason of the seven-volt input signal and seven-volt reference signal to comparator circuit 13, comparator circuit 13 and flip-flop circuit 39 are both in the "1" state. Delay devices 40, 41, and 42 are also in the "1" state. The output signals or states of delay devices 41, 42, and flip-flop 39 comprise the binary conversion of the seventh and last sample (111=7).

FIG. 3 shows a timing diagram of the system shown in FIG. 1 for an input signal as shown. The waveforms of the flip-flop and delay devices are represented as "1" equal to a positive voltage where the base line of each waveform is arbitrarily chosen as zero. The sync pulses are one microsecond wide with a rise time of about 20 millimicroseconds and the flip-flop waveforms having rise and fall time of about thirty to fifty millimicroseconds, the width thereof being determined, at least in part, by the amplitude of the input signal. The comparator waveforms have a very fast rise time (.1 microsecond, for example), and the width thereof is determined by the amplitude of the input signal. A series of samples are represented.

Since many changes could be made in the above-described construction and many apparently widely different embodiments of the present invention could be made without departing from the scope thereof, it is intended that all matter contained in the above description or shown in the accompanying drawings shall be interpreted as illustrative and not in a limiting sense.

What is claimed is:
1. In combination:
means for providing a plurality of input signals from a common source;
a plurality of comparator means having input and output circuits, each of said comparator circuits being operable to one of two conditions in response to input signals which exceed pre-established values;
coupling means for feeding each signal from said common source sequentially into said comparator means in a predetermined time sequence, said coupling means including a storage element connected in the input circuit of said comparator means;

and means for feeding synchronization signals sequentially to said comparator means in the same predetermined time sequence.

2. In a system which upon actuation by synchronization signals assumes at least two different conditions in accordance with variations of an input signal, the combination comprising:

a plurality of comparator circuits, each including a signal input circuit and a synchronization signal input circuit comparable to either of two different conditions;

coupling means comprising delay line devices to progressively apply each input signal and each synchronization signal to said comparator circuits in a predetermined timed sequence;

and means for controlling said comparator circuits to change from one condition to the other as determined by the characteristic of said input signals.

3. In combination:

means for providing a common source of a plurality of input signals;

a plurality of comparison circuits actuated by synchronization signals, each including a signal input circuit and a synchronization signal input circuit and a reference signal input circuit;

coupling means for sequentially feeding each of said input signals to said comparison circuits, each of said comparison circuits being adapted to produce a signal output upon receipt of a synchronization signal when one of said input signals equals or exceeds the particular reference signal coupled to the reference signal input circuit of that particular comparison circuit;

means for sequentially applying each synchronization signal to said comparison circuits;

and means for controlling successive comparison circuits in response to the signal ouput of preceding comparison circuits.

4. In combination:

a plurality of comparison circuits progressively coupled to each other, each including a signal input circuit, a reference signal input circuit and a synchronization signal input circuit for producing an output signal in response to a synchronization signal when an input signal equals or exceeds the particular reference signal coupled to the reference input circuit of that particular comparison circuit;

means for applying input and synchronization input signals into said comparison circuits;

means for sequentially time delaying each of said input signals and synchronization input signals the same time interval prior to their application to succeeding comparison circuits;

and means for deriving a reference signal from the output signal of preceding comparison circuits in response to the amplitude of said input signal.

5. Apparatus for obtaining signals representing the instantaneous amplitude of a signal wave comprising:

means for applying each said signal wave to a plurality of comparison circuits in a predetermined time sequence;

each of said comparison circuits producing an output signal upon receipt of an actuating signal when said signal wave is equal to or exceeds a particular reference signal coupled to that particular comparison circuit;

means for coupling an actuating signal to said comparison circuits in the same time sequence as said signal waves are applied;

and means for deriving a reference signal for successive comparison circuits from the output signal of preceding comparison circuits.

6. Means for producing a code representative of the characteristic of an input signal comprising:

a plurality of comparator circuits operable to either of two different conditions depending on the characteristic of an input signal applied thereto as compared to a reference signal likewise applied thereto;

means to progressively apply in a predetermined time sequence control signals to a plurality of said comparator circuits to enable said comparator circuits to change from one condition to another at selected intervals;

and means to progressively apply said input signal to said comparator circuits in the same predetermined time sequence, said means including an individual delay means to store said input signal prior to the operation of said comparator circuits.

7. In combination:

a plurality of comparator circuits for providing an output signal in response to actuating signals when an input signal exceeds a particular reference signal associated with that comparator circuit;

means for providing actuating signals progressively delayed in time to said comparator circuits;

means for feeding input signals into said comparator circuits independently of the time of occurrence of said actuating signals;

and means for deriving reference signals for succeeding comparator circuits from the output signal of preceding comparator circuits.

8. Apparatus for providing $n$ digit output signals representing the instantaneous amplitude of an input signal wave comprising:

$n$ comparator circuits to provide $n$ output signals when said signal wave exceeds reference signals coupled to said comparator circuits;

means for applying said signal wave into a first of said comparator circuits;

means for feeding an actuating signal into said comparator circuit to actuate said comparator circuit substantially independently of other of said actuating signals;

means for sequentially delaying said signal wave and said actuating signal prior to introduction into a second of said comparator circuits;

and means for deriving a reference signal from said output signal.

9. A system for producing a code representative of a characteristic of an input signal, the combination comprising:

means for introducing said input signal into a first comparison circuit;

means for delaying said input signal prior to introducing said signal into successive comparison circuits;

each of said comparison circuits producing a pulse output when said input signal is equal to or exceeds a particular reference signal associated with that particular comparison circuit;

means for producing a control signal;

means for progressively delaying said control signal prior to introducing said control signal into each of said comparison circuits;

and means associated with each of said pulse outputs from said comparison circuits for producing said reference signals.

10. In combination:

a plurality of comparator circuits operable to either a binary "0" or binary "1" condition;

means to progressively apply an input signal to said comparator circuits at a predetermined rate;

means for coupling progressively lower biasing signals to said comparator circuits;

means for coupling the bias voltage of preceding comparator circuits to succeeding comparator circuits when preceding comparator circuits are in one of said binary conditions;

and timing means for operating said comparator circuits at a random repetition rate.

11. In a system for producing a code representative of a characteristic of an input signal the combination comprising:
a plurality of comparator circuits operable to either of two different conditions;
means to progressively apply at fixed successive increments of time said input signal to said comparator circuits in an already determined time sequence;
and means including control signals, each progressively applied to said comparator at the same fixed increment of time, for controlling said comparator circuits to change from one condition to another at randomly selected intervals as determined by the characteristic of said input signal.

12. An analog-to-digital converter comprising:
a plurality of consecutive comparator circuits operable to either a binary zero or binary "1" condition;
means including delay devices each having an additional unit of delay to progressively apply said input signal to said comparator circuits in a predetermined time sequence;
means for coupling fixed and progressively lower bias voltages to said comparator circuits;
means for coupling the bias voltage on each comparator circuit at said predetermined rate to each succeeding comparator circuit when each comparator circuit is in one of said binary conditions;
and timing means comprising synchronization pulses progressively applied to said comparator circuits to enable said comparator circuits to operate at the repetition rate of said synchronization pulses.

13. A signal wave translating circuit comprising a plurality of comparison means to provide an output signal when said signal wave exceeds a reference signal;
means for applying the same actuating signal to each of said comparison circuits;
means for sequentially feeding the same input signal into each comparison means;
said comparison means accepting said input and actuating signal independently of the repetition rate of said actuating signal;
and means for deriving a reference signal from each output signal of preceding comparison means.

References Cited in the file of this patent
UNITED STATES PATENTS

| | | |
|---|---|---|
| 2,453,461 | Schelleng | Nov. 9, 1948 |
| 2,876,418 | Villars | Mar. 3, 1959 |
| 2,896,198 | Bennett | July 21, 1959 |
| 3,100,298 | Fluhr | Aug. 6, 1963 |